United States Patent [19]

Shimosaka et al.

[11] Patent Number: 5,327,276

[45] Date of Patent: Jul. 5, 1994

[54] OPTICAL LOCAL AREA NETWORK SYSTEM AND NODE APPARATUS USED IN THE SAME

[75] Inventors: Naoki Shimosaka; Katsumi Emura, both of Tokyo, Japan

[73] Assignee: Nec Corporation, Tokyo, Japan

[21] Appl. No.: 961,391

[22] Filed: Oct. 15, 1992

[30] Foreign Application Priority Data

Oct. 15, 1991 [JP] Japan .................................. 3-296166
Oct. 31, 1991 [JP] Japan .................................. 3-313453

[51] Int. Cl.$^5$ .......................................... H04J 14/02
[52] U.S. Cl. .................................. 359/125; 359/165
[58] Field of Search ............... 359/123, 124, 125, 126, 359/135, 165

[56] References Cited

U.S. PATENT DOCUMENTS

| | | | |
|---|---|---|---|
| 4,759,011 | 7/1988 | Hicks | 359/126 |
| 5,086,349 | 2/1992 | Okayama | 359/135 |
| 5,101,290 | 3/1992 | Erg | 359/123 |

OTHER PUBLICATIONS

IEEE Journal on Seleced Areas in Communication, vol. 6, No. 6, Jul. 1, 1988, pp. 959-973, Andres Albanese et al., "Loop distribution using coherent detection".
Optics and Laser Technology, vol. 221, No. 2, Apr. 1, 1990, pp. 113-126, J. M. Senior et al., "Wavelength division multiplexing in optical fibre sensor systems and networks: a review".
Technical Digest-Western Electric, No. 75, Sep. 1, 1984, pp. 9-10, S. S. Cheng et al., "Subscriber loop architecture".

*Primary Examiner*—Leslie Pascal
*Attorney, Agent, or Firm*—Sughrue, Mion, Zinn, Macpeak & Seas

[57] ABSTRACT

When a data transmission request is received in a node apparatus in an optical LAN system, the node apparatus receives a light of a wavelength assigned to a destinated node apparatus. Where the received light is not a modulated light, the received light will be modulated by a transmitting data, and where the received light is a modulated light, the received light is passed through the transmitting node apparatus without a further modulation.

14 Claims, 10 Drawing Sheets

OPTICAL LOCAL AREA NETWORK SYSTEM AND NODE APPARATUS USED IN THE SAME

FIELD OF THE INVENTION

This invention relates to an optical local area network (LAN) system and a node apparatus used in the same, and more particularly to, an access control system for an optical LAN system and a node apparatus which is accessed by the access control system.

BACKGROUND OF THE INVENTION

A conventional media access control system utilizing a token passing method in an optical LAN system has been described on pages 238 to 256 of "Proceedings of IEEE", Vol. 77, 1988. In this optical LAN system, a plurality of node apparatus are connected by optical fibers to provide a loop type optical network system. Each of the node apparatus comprises an access processing circuit for carrying out the processing of an access to a node apparatus, an optical to electric (O/E)- converter for converting an optical signal received from an optical fiber transmission line to an electric signal to be supplied to the access processing circuit, and an electric to optical (E/O) converter for converting an electric signal supplied from the access processing circuit to an optical signal to be supplied to the optical fiber transmission line, and is assigned with an address to be discriminated from the other node apparatus. If it is assumed that the number of node apparatus is four, the first to fourth node apparatus are assigned with address signals "00", "01", "10" and "11" by using two bit signals.

In operation, when the first node apparatus receives a data transmission request to the third node apparatus, the access processing circuit of the first node apparatus captures a token packet which is converted to electric signals in the O/E converter of the first node apparatus. In this access processing circuit, the data packet is processed to include the address signal "10" of the third node apparatus at a header portion thereof, and data to be transmitted from the first node apparatus to the third node apparatus at a data portion thereof. Thus, the token packet and the data packet are supplied from the access processing circuit of the first node apparatus via the E/O converter thereof to the optical fiber transmission line, through which the token and data packets are transmitted to the third node apparatus. Thus, the data packet is transmitted from the first node apparatus to the third node apparatus. In this data packet transmission, the data packet is not pulled into the second node apparatus, because the address signal "10" at the header portion of the data packet does not coincide with the address signal "01" of the second node apparatus.

However, the conventional access control system in the optical LAN system has a disadvantage in that a token packet is converted between optical and electric signals and is subjected to the access processing even in a node apparatus having no transmission request, and a data packet is also converted between optical and electric signals and is subject to the access processing even in a node apparatus other than a node apparatus receiving data transmitted from another node apparatus. As a result, where there are a number of node apparatus having transmission requests, it takes a long time for a certain node apparatus to acquire a token packet, thereby lowering a through-put of the optical LAN system. In addition, there is a disadvantage in that jitter occurs in the access processing circuits of the node apparatus for processing a data packet electrically to deteriorate a bit error rate characteristic in accordance with an amount of the jitter proportional to the number of the node apparatus through which the data packet is transmitted. This results in the limitation on the number of node apparatus included in an optical LAN system. Further, there is a disadvantage in that a damage of either O/E converter, access processing circuit or E/O converter in any of node apparatus spreads to the whole network, because all the data packets are processed in the above components.

SUMMARY OF THE INVENTION

Accordingly, it is an object of the invention to provide an optical LAN system and a node apparatus used in the same in which a through-put of the system is improved.

It is another object of the invention to provide an optical LAN system and a node apparatus used in the same in which there is no limitation on the number of node apparatus included in the system.

It is a further object of the invention to provide an optical LAN system and a node apparatus for the same in which data transmission can be continued, even if one of the node apparatus becomes damaged.

According to a feature of the invention, a loop type optical LAN system, comprises:
- a plurality of node apparatus each being assigned with an address wavelength which is different from others; and
- an optical fiber transmission line for connecting said plurality of node apparatus;
- wherein each of said plurality of node apparatus in receiving mode supplies a non-modulated light of said address wavelength on said optical fiber transmission line, and, in case where a first node apparatus selected from said plurality of node apparatus transmits data to a second node apparatus selected from said plurality of node apparatus, a light supplied from said second node apparatus is modulated by said data in said first node apparatus to be supplied on said optical fiber transmission line.

According to the another feature of the invention, a node apparatus used in an optical LAN system, comprises:
- a fixed wavelength optical filter having first and second input terminals and first and second output terminals, said fixed wavelength optical filter being supplied at said first input terminal with wavelength division multiplexed lights including an address wavelength inherently assigned to said node apparatus to provide a light of said address wavelength at said second output terminal and said wavelength division multiplexed lightdexcluding said address wavelength at said first output terminal, and at said second input terminal with a light of said address wavelength to provide said light of said address wavelength at said first output terminal;
- a first optical to electric converter for converting said light of said address wavelength supplied from said second output terminal of said fixed wavelength optical filter to a first electric signal;
- a light emitting device for providing said second input terminal of said fixed wavelength optical filter with a light of said address wavelength;

a variable wavelength optical filter having first and second input terminals and first and second output terminals, said tunable wavelength optical filter being supplied with said wavelength division multiplexed light at said first input terminal to output a light of a destination address wavelength selected from said multiplexed wavelengths at said second output terminal and wavelength division multiplexed light excluding said destination address wavelength and said light of said destination address wavelength modulated by a transmitting data supplied to said second input terminal thereof at said first output terminal;

an optical modulator for providing said first input terminal of said optical tunable wavelength optical filter with said light of said destination address wavelength modulated by said transmitting data; and an access processing circuit for receiving said first electric signal to generate a data transmitted to said node apparatus and driving said modulator by said transmitting data.

BRIEF DESCRIPTION OF THE DRAWINGS

The invention will be described in more detail in conjunction with appended drawings; wherein.

DESCRIPTION OF THE PREFERRED EMBODIMENTS

Before explaining preferred embodiments of the invention, the aforementioned conventional loop type optical LAN system and node apparatus will be explained in FIGS. 1 and 2.

Figure 1:
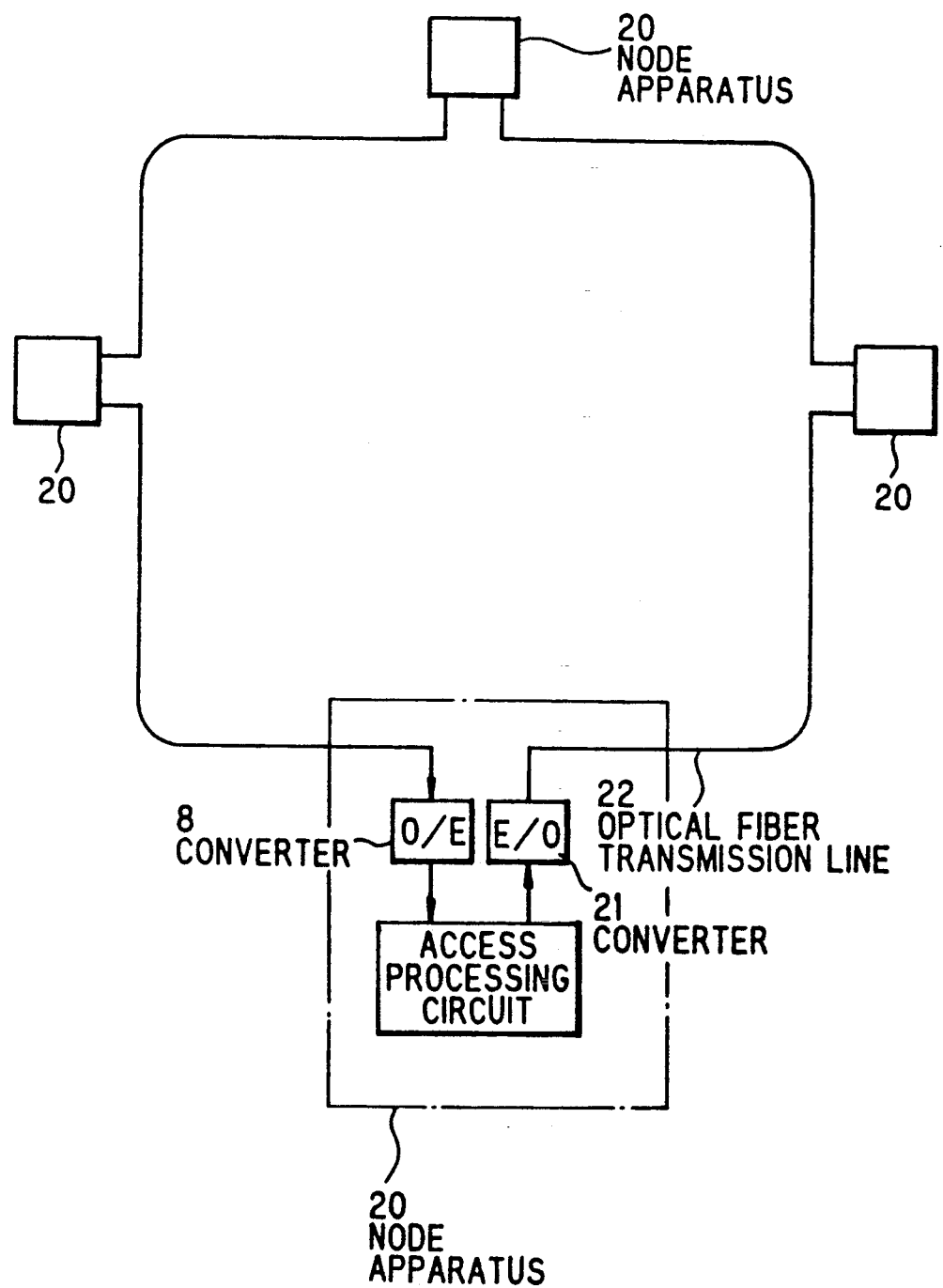
FIG. 1 is a block diagram showing a conventional loop type LAN system.

In FIG. 1, the conventional optical LAN system comprises a plurality of node apparatus 20, and an optical fiber transmission line 22 for connecting the node apparatus 20 in loop pattern to each other.

Each of the node apparatus 20 comprises O/E and E/O converters 8 and 21 for carrying out conversion between optical and electric signals, and an access processing circuit 11 for carrying out access processing in accordance with an electric signal supplied from the O/E converter 8 and supplying an electric signal to the E/O converter 21 in accordance with the access processing result.

Figure 2:
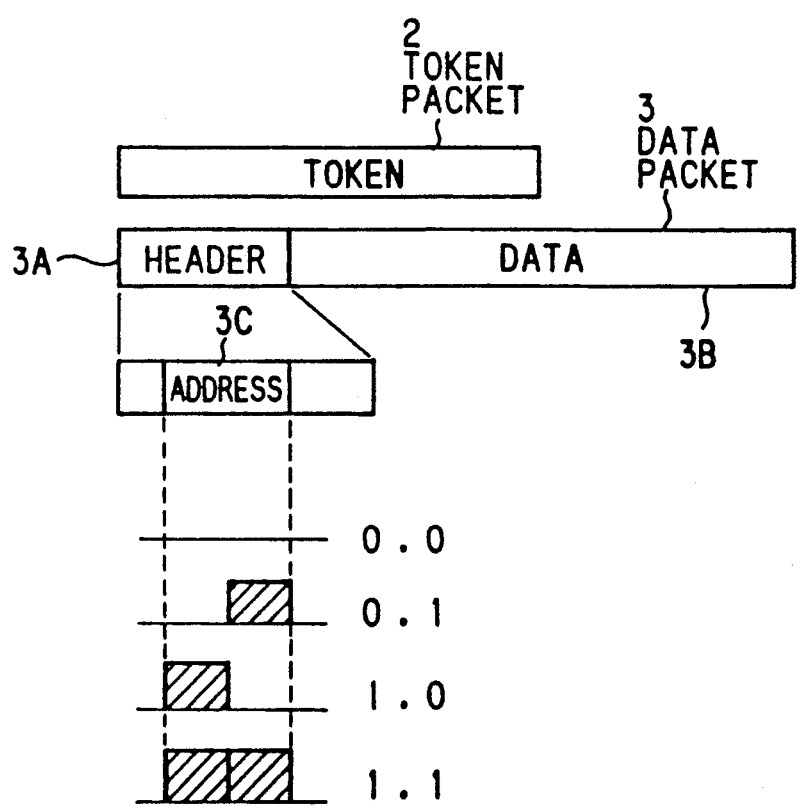
FIG. 2 is a diagram explaining a token packet and a data packet including an address of a node apparatus.

In FIG. 2, there are shown a token packet 2 and a data packet 3. The token packet 2 is circulated through the optical fiber transmission line 22 to provide one of the node apparatus 20 with a right to transmit data to the other one of the node apparatus 20, so that collision of data transmission from two or more of the node apparatus 20 to a common node apparatus 20 is avoided. The data packet 3 comprises a header portion 3A and a data portion 3B, and the header portion 3A comprises an address 3C representing a destination of data included in the data portion 3B. If it is assumed that the number of the node apparatus 20 is four as shown in FIG. 1, two-bit address signals "00", "01", "10" and "11" are assigned to the four node apparatus 20, correspondingly, as shown in FIG. 2.

Operation of the conventional optical LAN system and node apparatus has been previously explained, so that it will not be explained here.

Next, an optical LAN system and a node apparatus used in the LAN system of a first preferred embodiment according to the invention will be explained in FIGS. 3A to 3D and 4.

In FIGS. 3A to 3D, first to fourth node apparatus 1A to 1D are assigned with address wavelength $\lambda_1$ to $\lambda_4$ and connected in loop pattern to each other by an optical fiber transmission line 31.

Figure 3A:
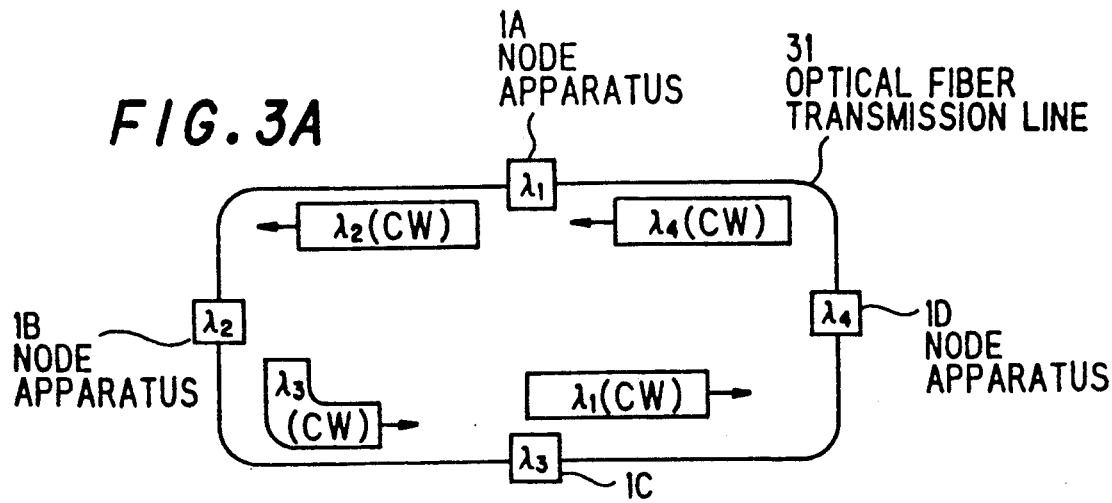
FIGS. 3A to 3D are block diagrams explaining an optical LAN system of a first preferred embodiment according to the invention.
Figure 3B:
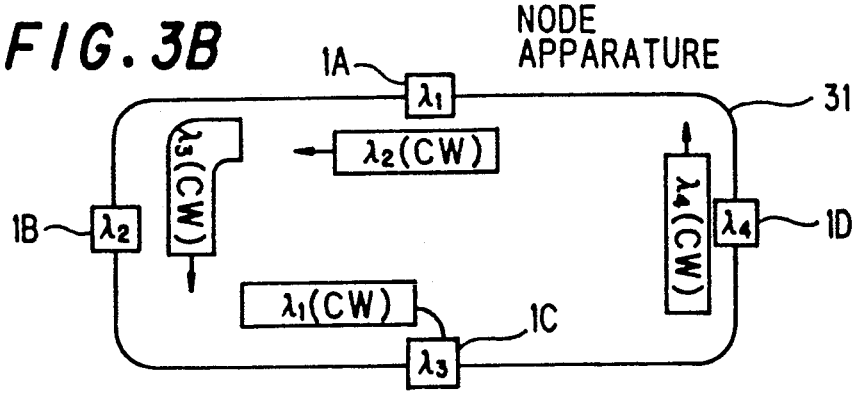
Figure 3C:
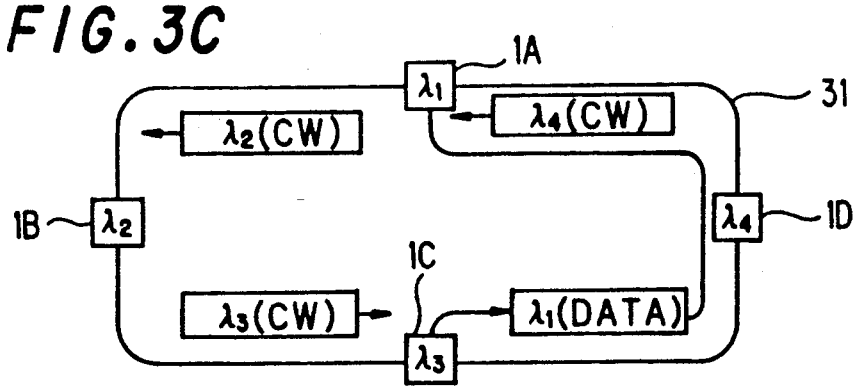
Figure 3D:
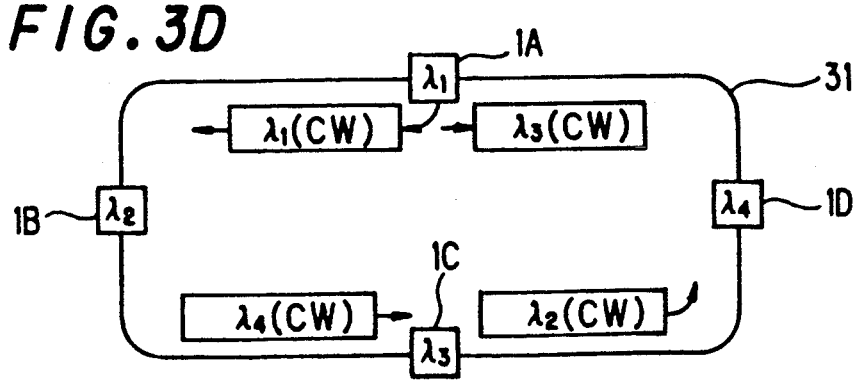

In operation, it is assumed that the third node apparatus 1C having the address wavelength $\lambda_3$ transmits data to the first node apparatus 1A having the address wavelength $\lambda_1$. In FIG. 3A, each node apparatus (1A to 1D) supplies a continuous wave (CW) light of each address wavelength ($\lambda_1$ to $\lambda_4$), a time duration of which is slightly longer than that of a data packet, on the optical fiber transmission line 31 during a state where each node apparatus (1A to 1D) is possible to receive data from the other node apparatus (1A to 1D). The third node apparatus 1C receives a light signal of the wavelength $\lambda_1$ to be pulled therein in accordance with a transmission request from the third node apparatus 1C to the first node apparatus 1A. The pulled-in light signal is discriminated in the third node apparatus 1C whether it is a CW light or a data packet. When the data packet is detected in the third node apparatus, the detected data packet is again supplied on the optical fiber transmission line 31 without supplying a data packet thereon from the third node apparatus 1C. On the other hand, when the pulled-in light signal is a CW light "$\lambda_1$ (CW)" as shown in FIG. 3B, the CW light is modulated in the third node apparatus 1C to be supplied on the optical fiber transmission line 31 as a data packet "$\lambda_1$ (DATA)", as shown in FIG. 3C.

The data packet "$\lambda_1$ (DATA)" is pulled in the first node apparatus to be demodulated, so that data supplied from the third node apparatus 1C is obtained in the first node apparatus 1A, from which a CW light of the wavelength $\lambda_1$ is supplied on the optical fiber transmission line 31 for the next data transmission from one of the second to fourth node apparatus 1B to 1D to the first node apparatus 1A, as shown in 3D.

Figure 4:
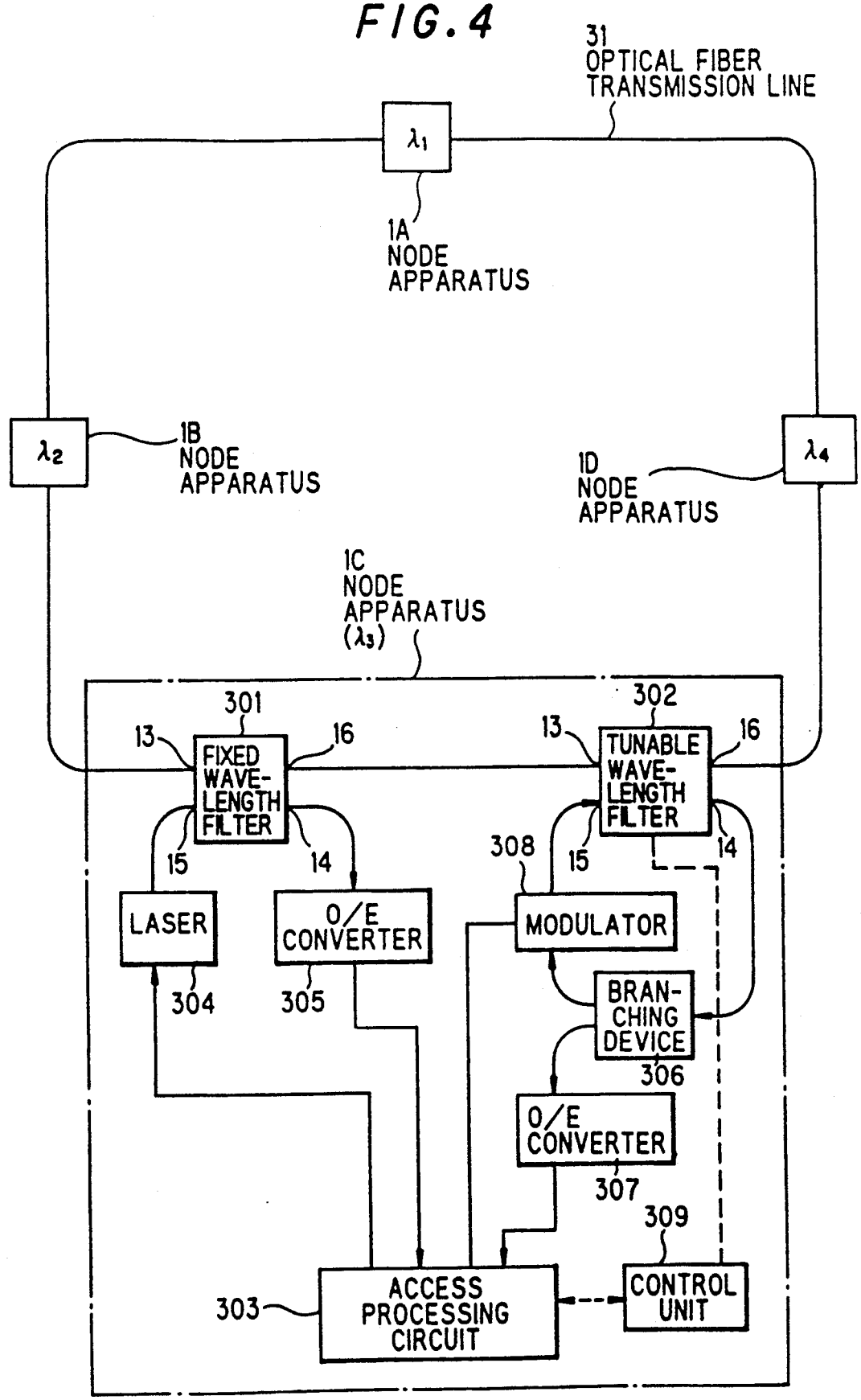
FIG. 4 is a block diagram showing a node apparatus used in the LAN system of a first preferred embodiment according to the invention.

FIG. 4 shows the structure of the third node apparatus 1C which is the same in structure as that of the first, second and fourth node apparatus 1A, 1B and 1D. The third node apparatus 1C comprises a fixed wavelength filter 301, a variable wavelength filter 302, an access processing circuit 303, a laser device 304, a first O/E converter 305, an optical branching device 306, a second O/E converter 307, an optical intensity modulator 308, and a control circuit 309.

Figure 5:
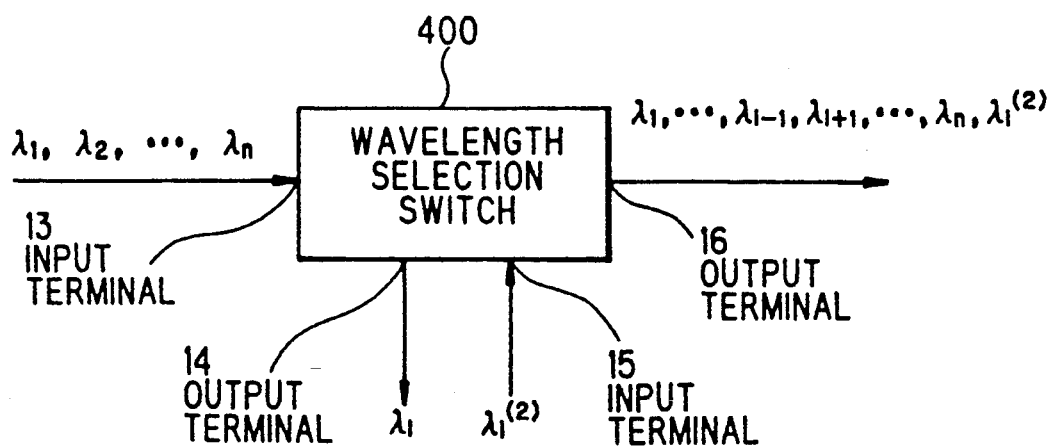
FIG. 5 is a diagram explaining a wavelength selection switch used in the node apparatus of FIG. 4.

FIG. 5 shows an optical wavelength selection switch 400 which is used as the fixed and variable wavelength filters 301 and 302. The optical wavelength selection switch 400 is provided with a first input terminal 13, to which a multiplexed light of wavelength $\lambda_1, \lambda_2, \ldots, \lambda_n$, a first output terminal 14, from which a light of a selected wavelength $\lambda_i$ is supplied, a second input terminal 15, to which a light of a wavelength $\lambda_i$ (depicted $\lambda_i{}^{(2)}$ to discriminate from the selected wavelength $\lambda_i$) is supplied, and a second output terminal 16, from which a multiplexed light of the non-selected wavelengths $\lambda_1, \lambda_2, \ldots \lambda_{i-1}, \lambda_{i+1}, \ldots, \lambda_n$ and the added wavelength $\lambda_i{}^{(2)}$ is supplied. When this is used as the fixed wavelength filter 301, the selected wavelength $\lambda_1$ is fixed, and, when this is used as the variable wavelength filter 302, the selected wavelength $\lambda_1$ is variable.

Such an optical wavelength filter is described in a report entitled "Polarization-independent acoustically-tunable optical filter effect" on pages 70 to 73 of Technical Digest, Vol. 3 for "15th European Conference on Optical Communication".

Figure 6:
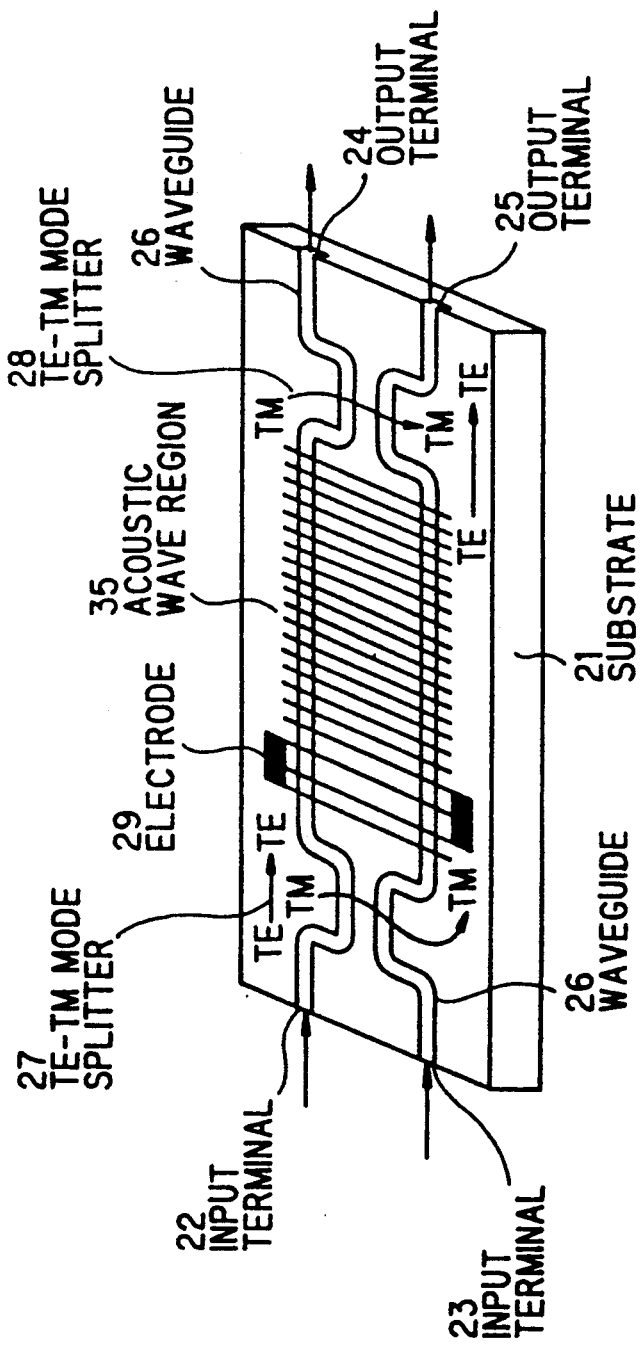
FIG. 6 is a schematic view showing an acoustoptic filter used in the node apparatus of FIG. 4, FIGS. 7A to 7C are block diagrams explaining an optical LAN system of a second preferred embodiment according to the invention.

FIG. 6 shows the tunable wavelength optical filter using acoustoptic effect which comprises two optical waveguides 26 provided on a lithium niobate substrate 21 by diffusing Ti thereinto, TE-TM mode splitters 27 and 28, an electrode 29, and an acoustic wave region 35. In this optical filter, a light signal supplied to an input terminal 22 is divided into two lights of TE and TM polarizations to be propagated through the two optical waveguides 26 by the TE-TM mode splitters 27, and the two propagated lights are combined to be supplied from an output terminal 24 by the TE-TM mode splitter 28. In this operation, when an electric signal of a certain frequency is applied to the electrode 29, TE-TM mode conversion is carried out for a light signal having a wavelength corresponding to the frequency of the electric signal on the optical waveguides in the acoustic wave region 35 in accordance with acoustoptic effect, so that only a light signal having the corresponding wavelength is obtained at an output terminal 24. By changing the frequency of the electric signal, a light signal of a predetermined wavelength is obtained at the output terminal 25. On the other hand, a light signal supplied to an input terminal 23 is obtained at the output terminal 25 without the application of an electric signal to the electrode 29, while a light signal of a predetermined wavelength is obtained at the output terminal 24 by selecting a frequency of an electric signal applied to the electrode 29.

When this acoustoptic filter is used as the fixed wavelength optical filter 301, a frequency of an electric signal applied to the electrode 29 is fixed, and, when it is used as the tunable wavelength optical filter 302, the frequency is varied, wherein the input terminals 22 and 23 correspond to the input terminals 13 and 15 of the wavelength selection switch 400, and the output terminals 24 and 25 correspond to those 14 and 16 of the wavelength selection switch 400.

The third node apparatus 3C having the address wavelength $\lambda_3$ as explained above in structure by reference to FIGS. 4 to 6 will be explained in operation.

When the third node apparatus 3C has no transmission request, a CW light of a wavelength $\lambda_3$ (identical to the selected wavelength $\lambda_i$) emitted from the laser device 304 is supplied to the second input terminal 15 of the fixed wavelength optical filter 301 to be propagated via the tunable wavelength optical filter 302 through the optical fiber transmission line 31 during a predetermined period longer than a length of a data packet prescribed in the LAN system. At this time, no electric signal is applied to an electrode of the optical filter 302, so that the CW light supplied to the first input terminal 13 of the optical filter 302 is obtained at the first output terminal 16 thereof to be supplied on the optical fiber transmission lines 31. Then, the CW light is circulated through the optical fiber transmission line 31 to be returned to the first input terminal 13 of the optical filter 301, and is obtained at the first output terminal 14 thereof to be supplied to the first 0/E converter 305, from which an electric signal is supplied to the access processing circuit 303. In this CW light transmission, the CW light may be modulated to be a data packet by one of the fourth, first and second node apparatus 1D, 1A and 1B. In such a case, the third node apparatus 1C receives data from one of the node apparatus 1D, 1A and 1B to be demodulated in the access processing circuit 303 therein. When no transmission request is still received in the third node apparatus 1C, the same procedure as described above is repeatedly carried out.

On the other hand, when the third node apparatus 1C has a transmission request, the frequency of the electric signal applied to the electrode of the optical filter 302 is controlled by the control circuit 309, so that a light of an address wavelength selected from the address wavelength $\lambda_1, \lambda_2$ and $\lambda_4$ of the first, second and fourth node apparatus 1A, 1B and 1D is obtained at the first output terminal 14 of the optical filter 302 to be supplied to the optical branching device 306, by which 90% of the light is supplied to the optical intensity modulator 308, and 10% of the light is supplied to the second 0/E converter 307. Thus, a converted electric signal is supplied from the second 0/E converter 307 to the access processing circuit 303, in which it is determined whether the received light is a CW light or a data packet. When the received light is a data packet, the access control circuit 303 controls the optical intensity modulator 308 not to operate, so that the data packet is passed through the optical intensity modulator 308 to be supplied to the second input terminal 15 of the optical filter 302, and is then obtained at the Second output terminal 16 thereof to be supplied on the optical fiber transmission line 31. On the other hand, when the received light is a CW light, the access processing circuit 303 controls the optical intensity modulator 308 to modulate the CW light in accordance with data transmitted from the third node apparatus 1C to one of the first, second and fourth node apparatus 1A, 1B and 1D, so that a data packet thus modulated is supplied to the second input terminal 15 of the optical filter 302. Thus, the data packet which is generated in the third node apparatus 1C is supplied from the second output terminal 16 of the optical filter 302 on the optical filter transmission line 31.

An optical LAN system and a node apparatus used in the LAN system of a second preferred embodiment according to the invention will be explained in FIGS. 7A to 7C and 8.

Figure 7A:
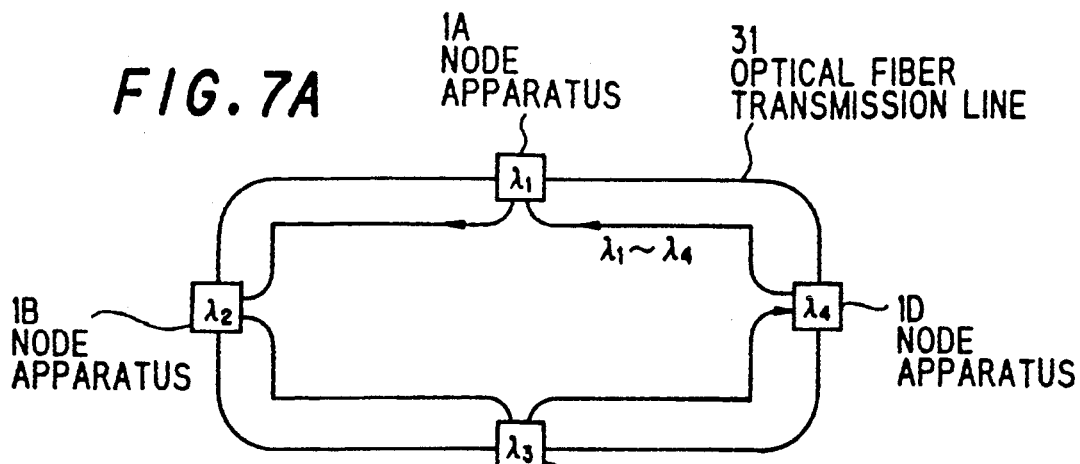
Figure 7B:
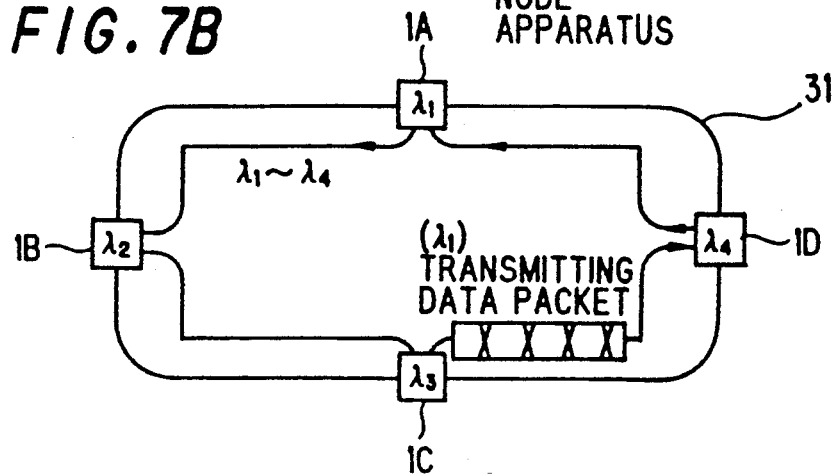
Figure 7C:
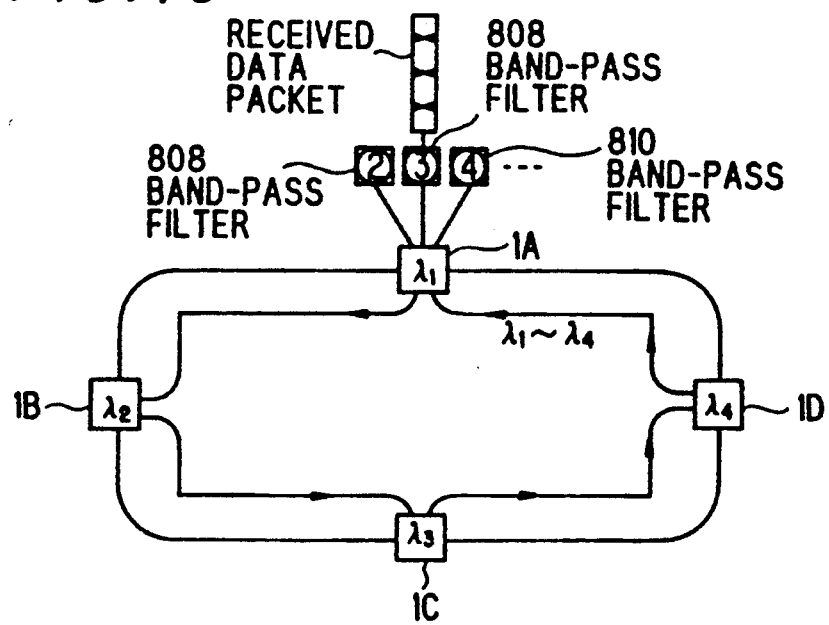

In FIGS. 7A to 7C, first to fourth node apparatus 1A to 1D are assigned with address wavelengths $\lambda_1$ to $\lambda_4$ and connected in loop pattern to each other by an optical fiber transmission line 31.

In operation, each node apparatus (1A to 1D) supplies a CW light of an address wavelength ($\lambda_1$ to $\lambda_4$) on the optical fiber transmission line 31, as shown in FIG. 7A. Here, it is assumed that data is transmitted from the third node apparatus 1C to the first node apparatus 1A, so that, in the third node apparatus 1C, a CW light of the wavelength $\lambda_1$ is modulated to generate a data packet to be supplied to the first node apparatus 1A, as shown in FIG. 7B.

In this modulation of the CW light having the wavelength $\lambda_1$, a sine wave carrier signal of a frequency $f_3$ which is modulated by the transmission data is used as a modulating signal, by which an optical modulator (not shown) is driven. In other cases, CW lights are modulated by sine wave carrier signals of frequencies $f_1$, $f_2$ and $f_4$ which are modulated by transmission data dependent on a transmitting node apparatus (1A, 1B or 1D). The data packet to be transmitted from the third node apparatus 1C to the first node apparatus 1A is received in the first node apparatus 1A in accordance with the address wavelength $\lambda_1$. In the first node apparatus 1A, the received data packet is converted from an optical signal to an electric signal, and the electric signal is passed through a band-pass filter 809 of a center frequency $f_3$, and then demodulated to provide the first node apparatus 1A with the transmission data.

Figure 8:
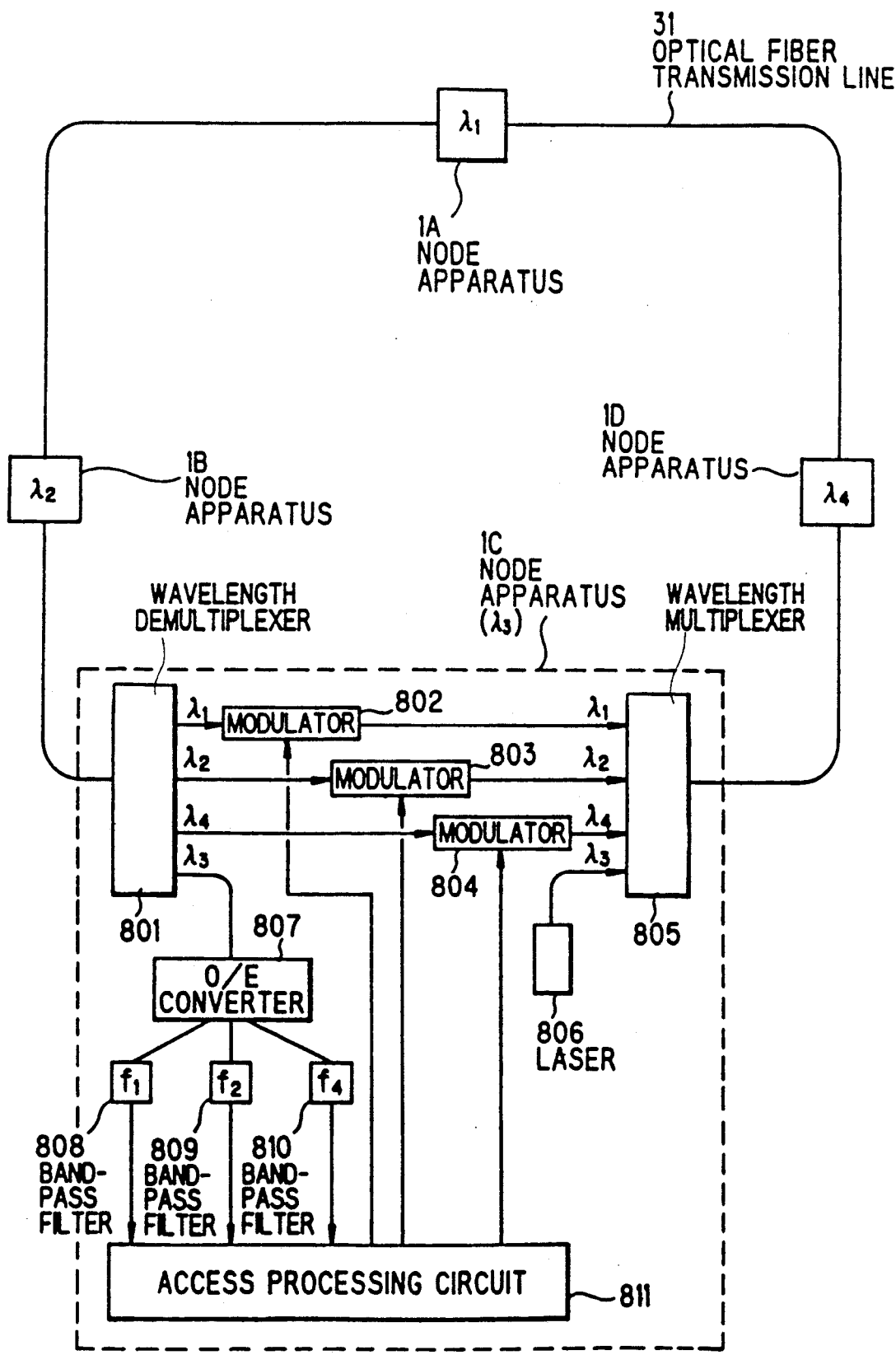
FIG. 8 is a block diagram showing a node apparatus used in the LAN system of a second preferred embodiment according to the invention.

FIG. 8 shows the third node apparatus 1C which comprises an optical branching device 801, optical (light intensity) modulators 802 to 804, an optical combining device 805, a laser device 806, an O/E converter 807, band-pass filters 808 to 810 of center frequencies $f_1$, $f_2$ and $f_4$, and an access processing circuit 811. The structure and the principle of the optical branching device 801 are described in "Coherent Optical Fiber Communication" by Okoshi and Kikuchi published in 1988 by Kluwer Academic Publishers, and the optical combining device 805 is obtained by arranging the optical branching device 801 in reverse direction with respect to input and output terminals.

In operation, it is assumed as described in FIGS. 7A to 7C that data is transmitted from the third node apparatus 1C to the first node apparatus 1A. In accordance with the transmission request, a CW light of a wavelength $\lambda_1$ supplied from the first node apparatus 1A is modulated in the modulator 802 which is driven by a sine wave carrier signal of a frequency $f_3$ modulated by the transmission data among lights of wavelengths $\lambda_1$ to $\lambda_4$ which are branched by the optical branching device 801. At this state, the optical modulators 803 and 804 are not driven, so that the lights of the wavelength $\lambda_2$ and $\lambda_4$ are passed therethrough. Simultaneously, a CW light of the wavelength $\lambda_3$ is emitted from the laser device 806 to be supplied to the optical combining device 805, in which the modulated light (data packet) of the wavelength $\lambda_1$, the non-modulated lights (CW lights) of the wavelengths $\lambda_2$ and $\lambda_4$, and the emitted light of the wavelength $\lambda_1$ are combined to be supplied on the optical fiber transmission line 31 by the optical combining device 805.

The branched light of the wavelength $\lambda_3$ is converted to an electric signal by the O/E converter 807, and the electric signal is supplied to the band-pass filters 808, 809 and 810 of the center frequencies $f_1$, $f_2$ and $f_4$. The output signals of the band-pass filters 808, 809 and 810 are supplied to the access processing circuit 811, in which a transmitting node apparatus is determined in accordance with a band-pass filter supplying data thereto among the band-pass filters 808, 809 and 810.

Figure 9:
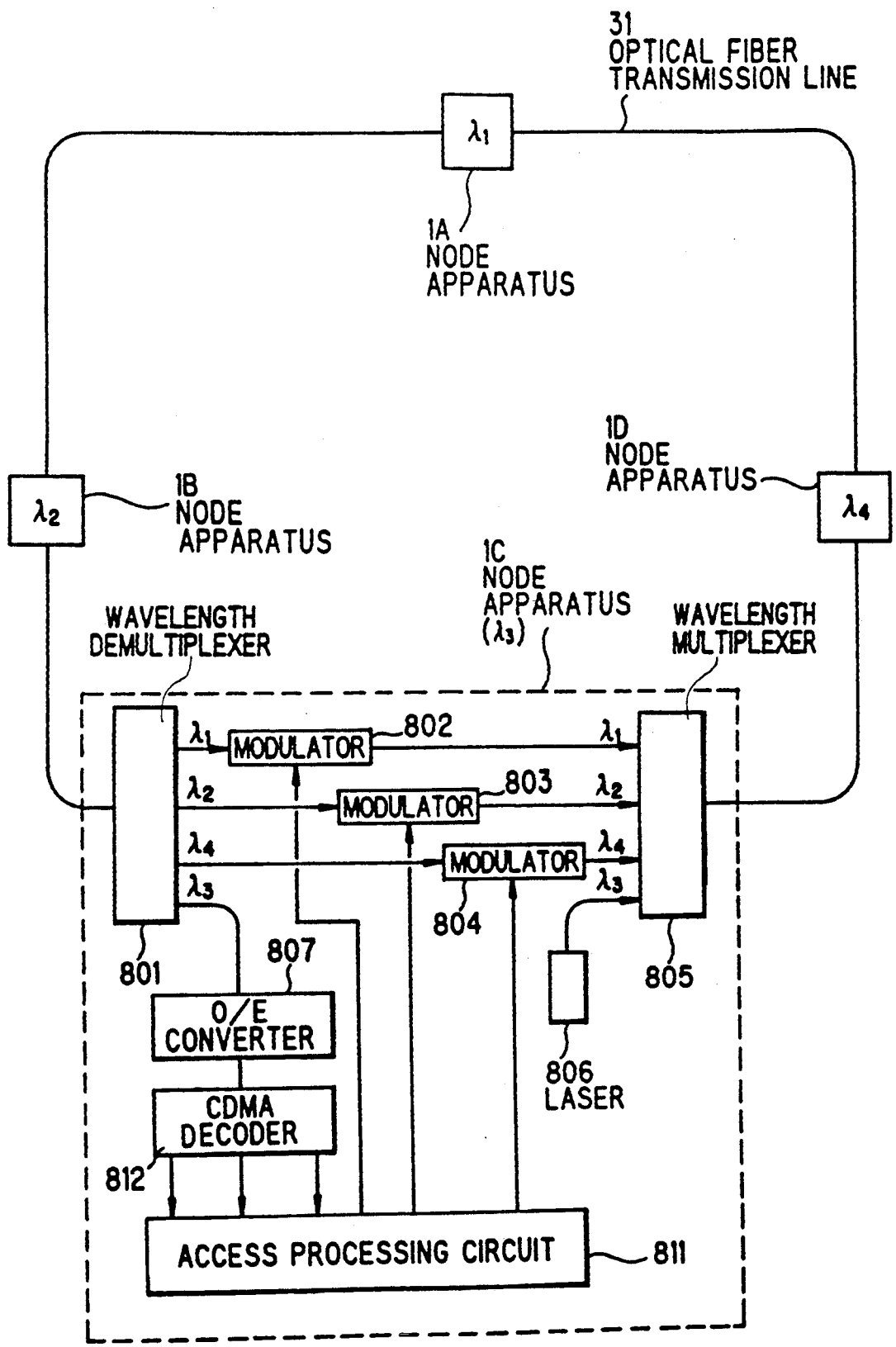
FIGS. 9 and 10 are block diagrams showing node apparatus of third and fourth preferred embodiments according to the invention.

FIG. 9 shows an LAN system of a third preferred embodiment according to the invention which comprises first to fourth node apparatus 1A to 1D connected in loop pattern to each other by an optical fiber transmission line 31. In this LAN system, the first to fourth node apparatus 1A to 1D are assigned with address wavelengths $\lambda_1$ to $\lambda_4$, correspondingly, as explained in the first and second preferred embodiments, and with CDMA (Code Division Multiple Access) codes inherent thereto, correspondingly.

The node apparatus 1C of FIG. 9 has the same structure as that of the node apparatus 1C of FIG. 8, except that the band-pass filters 808 to 810 are replaced by a CDMA decoder 812, and the access processing circuit 811 supplies CDMA-coded signals which are modulated by transmission data to the optical modulators 802 to 804 in FIG. 9 in place of sine wave carrier signals as used in FIG. 8. The node apparatus 1A, 1B and 1D have also the same structure as that of the node apparatus 1C in the third preferred embodiment.

In operation, it is assumed that data is transmitted from the third node apparatus 1C to the first node apparatus 1A. For this purpose, a light of the wavelength $\lambda_1$ which is an address wavelength for the first node apparatus 1A is supplied from the optical branching device 801 to the optical modulator 802, in which the light is modulated by the CDMA-coded signals inherent to the third node apparatus 1C and modulated in the access processing circuit 811 by transmission data. The light of the wavelength $\lambda_1$ thus modulated, non-modulated lights of the wavelength $\lambda_2$ and $\lambda_4$ passed through the optical modulators 803 and 804, and a light of the wavelength $\lambda_3$ emitted from the laser device 806 are combined in the optical combining device 805 to be supplied on the optical fiber transmission line 31. In this operation, it is also assumed that data is transmitted from the first node apparatus 1A to the third node apparatus 1C. For this purpose, a light of the wavelength $\lambda_3$ which is an address wavelength for the third node apparatus 1C is supplied from the optical branching device 801 to the O/E converter 807, in which an optical to electric converted signal is obtained to be supplied to the CDMA decoder 812. The CDMA-coded electric signal is decoded in the CDMA decoder 812, so that a CDMA code which is inherent to the first node apparatus 1A is obtained therein. Then, the CDMA code and the received modulated electric signal are supplied to the access processing circuit 811, in which the modulated electric signal is demodulated to provide the third node apparatus with a transmitted data which is determined to be transmitted from the first node apparatus 1A by the CDMA code.

Figure 10:
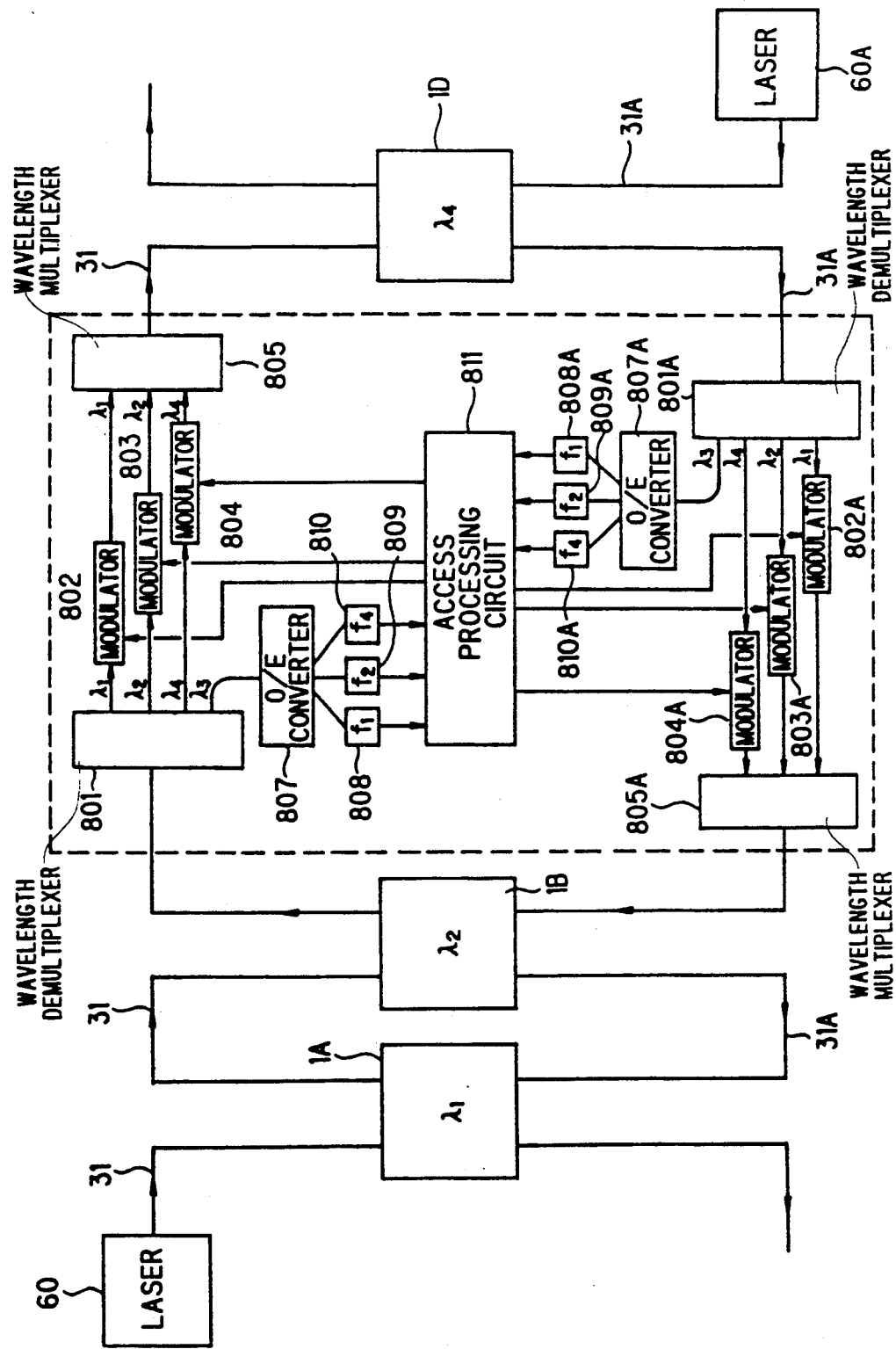

FIG. 10 shows an optical LAN system and a node apparatus used in the system of a fourth preferred embodiment according to the invention. The LAN system comprises first to fourth node apparatus 1A to 1D connected in tandem by up-and down-optical fiber transmission lines 31 and 31A, a first light source 60 connected to the up-optical fiber transmission line 31, and a second light source 60A connected to the down-optical fiber transmission line 31A. The first to fourth node apparatus 1A to 1D are assigned with address wavelengths $\lambda_1$ to $\lambda_4$, correspondingly, and the first and second light sources each comprises first to fourth laser devices for emitting lights of wavelengths $\lambda_1$ to $\lambda_4$. The first to fourth node apparatus 1A to 1D are of the same structure, for instance, as shown for the third node apparatus 1C which comprises optical branching devices 801 and 801A, optical modulators 802 to 804, and 802A to 804A, optical combining devices 805 and 805A, O/E converters 807 and 807A, band-pass filters of center frequencies $f_1$, $f_2$ and $f_4$ 808 to 810, and 808A to 810A, and an access processing circuit 811.

In operation, lights of the wavelengths $\lambda_1$ to $\lambda_4$ are emitted to be supplied on the up-and down-optical fiber transmission lines 31 and 31A, respectively. For instance, data is transmitted from the third node apparatus 1C to the first node apparatus 1A by modulating the light of the wavelength $\lambda_1$ in the optical modulator 802 or 802A by a sine wave carrier signal of a frequency $f_3$ modulated in the access processing circuit 811 by the transmission data.

On the other hand, data is received in the third node apparatus 1C, for instance, from the first node apparatus 1A by converting the light of the wavelength $\lambda_3$ to an electric signal in the O/E converter 807 or 807A, by passing the electric signal through the band-pass filters 808 to 810, or 808A to 810A, and by demodulating the electric signal supplied from the band-pass filter 808 or 808A of the center frequency $f_1$ to the access processing circuit 811.

Although the invention has been described with respect to specific embodiment for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical LAN system, comprising:
   a plurality of node apparatus each being assigned with an address wavelengths which is different from wavelengths assigned to other node apparatus; and
   an optical fiber transmission line for connecting said plurality of node apparatus;
   wherein each of said plurality of node apparatus in receiving mode supplies a light of said address wavelength on said optical fiber transmission line, and where a first node apparatus selected from said plurality of node apparatus transmits data to a second node apparatus selected from said plurality of node apparatus, a light supplied from said second node apparatus is modulated by said data in said first node apparatus to be supplied on said optical fiber transmission line.

2. An optical LAN system, according to claim 1, wherein:
   a modulation of said light supplied from said second node apparatus in said first node apparatus is carried out, only when said light supplied from said second node apparatus is determined to be a non-modulated light by said first node apparatus.

3. An optical LAN system, according to claim 2, wherein:
   said modulation of said light supplied from said second node apparatus in said first node apparatus is made by a sine wave carrier signal of a frequency inherently assigned to said first node apparatus, said sine wave carrier signal being modulated by said data.

4. An optical LAN system, according to claim 2, wherein:
   said modulation of said light supplied from said second node apparatus in said first node apparatus is made by a CDMA code inherently assigned to said first node apparatus, said CDMA code being modulated by said data.

5. An optical LAN system, comprising:
   a plurality of node apparatus each being assigned with an address wavelength which is different from wavelengths assigned to other node apparatus; and
   an optical fiber transmission line for connecting said plurality of node apparatus;
   wherein each of said plurality of node apparatus in receiving mode supplies a light of said address wavelength on said optical fiber transmission line, and where a first node apparatus selected from said plurality of node apparatus has no data transmission request, lights supplied from said plurality of node apparatus excluding said first node apparatus are passed through said first node apparatus, and only that light supplied from said first node apparatus and propagated through said optical fiber transmission line is pulled in said first node apparatus, and where said first node apparatus has a data transmission request to a second node apparatus selected from said plurality of node apparatus, a light supplied from said second node apparatus is modulated by data in said first node apparatus to be supplied on said optical fiber transmission line.

6. An optical LAN system, according to claim 5, wherein:
   a modulation of said light supplied from said second node apparatus in said first node apparatus is carried out, only when said light supplied from said second node apparatus is determined to be a non-modulated light by said first node apparatus.

7. An optical LAN system, according to claim 6, wherein:
   said modulation of said light supplied from said second node apparatus in said first node apparatus is made by a sine wave carrier signal of a frequency inherently assigned to said first node apparatus, said sine wave carrier signal being modulated by said data.

8. An optical LAN system, according to claim 6, wherein:
   said modulation of said light supplied from said second node apparatus in said first node apparatus is made by a CDMA code inherently assigned to said first node apparatus, said CDMA code being modulated by said data.

9. A node apparatus used in an optical LAN system, comprising:
   a fixed wavelength optical filter having first and second input terminals and first and second output terminals, said fixed wavelength optical filter being supplied at said first input terminal with wavelength division multiplexed light including an address wavelength inherently assigned to said node apparatus to output a light of said address wavelength at said second output terminal and said wavelength division multiplexed light excluding said address wavelength at said first output terminal, and at said second input terminal with a light of said address wavelength to output said light of said address wavelength at said first output terminal;
   a first optical to electric converter for converting said light of said address wavelength supplied from said second output terminal of said optical fixed wavelength filter to a first electric signal;
   a light emitting device for providing said second input terminal of said optical fixed wavelength filter with a light of said address wavelength;
   a tunable wavelength optical filter having first and second input terminals and first and second output terminals, said tunable wavelength optical filter being supplied with said lights of said multiplexed wavelengths at said first input terminal to output a light of a destination address wavelength selected from said multiplexed wavelengths at said second output terminal and lights of said multiplexed wavelengths excluding said destination address wavelength and said light of said destination address wavelength modulated by a transmitting data supplied to said second input terminal thereof at said first output terminal;

an optical modulator for providing said first input terminal of said optical variable wavelength filter with said light of said destination address wavelength modulated by said transmitting data; and an access processing circuit for receiving said first electric signal to generate a data transmitted to said node apparatus and driving said modulator by said transmitting data.

10. A node apparatus used in an optical LAN system, according to claim 9, further, comprising:

an optical branching device for branching said light of said destination address wavelength supplied from said second output terminal of said tunable wavelength optical filter to provide first and second branched lights, said first branched light being supplied to said modulator to be modulated by said transmitting data;

a second optical to electric converter for converting said second branched light to a second electric signal supplied to said access processing circuit, in which said destination address wavelength is checked in accordance with said second electric signal; and a control circuit for controlling said tunable wavelength optical filter to set said destination address wavelength to be a predetermined wavelength which is determined by a destinated node apparatus.

11. A node apparatus used in an optical LAN system, comprising:

an optical wavelength demultiplexer for demultiplexing multiplexed wavelengths supplied from an optical transmission line to a plurality of lights having a wavelength different from each other;

an optical to electric converter for converting one of said lights having an address wavelength inherently assigned to said node apparatus to an electric signal;

means for determining a modulating signal by which said electric signal has been modulated;

an access processing circuit for demodulating said electric signal to generate a transmitted data and determining a node apparatus from which said transmitted data is received in accordance with said modulating signal;

means for modulating one selected from said plurality of said lights excluding said light of said address wavelength by a transmitting data;

a light emitting device for emitting a light of said address wavelength; and an optical wavelength multiplexer for said plurality of lights supplied from said optical wavelength demultiplexer excluding said light supplied to said optical to electric converter, one of which is modulated by said means for modulating, and said light supplied from said light emitting device to provide an optical fiber transmission line with lights of said multiplexed wavelengths to be propagated therethrough.

12. A node apparatus used in an optical LAN system, according to claim 11, wherein:

said modulation signal determining means comprises a plurality of band-pass filters each having a center frequency different from others.

13. A node apparatus used in an optical LAN system, according to claim 11, wherein:

said modulating signal determining means is a CDMA decoder.

14. A node apparatus used in an optical LAN system, according to claim 11, wherein:

said optical wavelength demultiplexer, said optical to electric converter, said modulating signal determining means, said modulating means, and said optical wavelength multiplexer are provided by two sets, one of which is used for an up-optical fiber transmission line and the other of which is used for a down-optical fiber transmission line, and said access processing circuit is provided commonly for said up- and down-optical fiber transmission line.

* * * * *

UNITED STATES PATENT AND TRADEMARK OFFICE
CERTIFICATE OF CORRECTION

PATENT NO. : 5,327,276

DATED : July 5, 1994

INVENTOR(S) : Naoki Shimosaka et al.

It is certified that error appears in the above-identified patent and that said Letters Patent is hereby corrected as shown below:

TITLE PAGE
Assignee: delete "Nec", insert --NEC--.

Col. 2, line 56, delete "lightdexcluding", insert --light excluding--.

Signed and Sealed this

Twenty-fifth Day of October, 1994

Attest:

BRUCE LEHMAN

Attesting Officer    Commissioner of Patents and Trademarks